(12) United States Patent
Skaley et al.

(10) Patent No.: US 11,378,062 B2
(45) Date of Patent: Jul. 5, 2022

(54) TRANSMISSION SYSTEM FOR A WIND POWER PLANT

(71) Applicant: Universität Kassel, Kassel (DE)

(72) Inventors: Christian Skaley, Kassel (DE); Marcel Lerner, Mettmann (DE); Adrian Rienäcker, Pullach (DE); Alexander Dedekind, Kassel (DE); Sascha Umbach, Kassel (DE); Gerald Ochse, Kassel (DE)

(73) Assignee: Universität Kassel, Kassel (DE)

( * ) Notice: Subject to any disclaimer, the term of this patent is extended or adjusted under 35 U.S.C. 154(b) by 600 days.

(21) Appl. No.: 16/348,622

(22) PCT Filed: Sep. 28, 2017

(86) PCT No.: PCT/DE2017/100829
§ 371 (c)(1),
(2) Date: May 9, 2019

(87) PCT Pub. No.: WO2018/091019
PCT Pub. Date: May 24, 2018

(65) Prior Publication Data
US 2020/0063716 A1 Feb. 27, 2020

(30) Foreign Application Priority Data
Nov. 18, 2016 (DE) .......................... 102016122205.4

(51) Int. Cl.
*F03D 15/00* (2016.01)
*F16H 1/22* (2006.01)
(Continued)

(52) U.S. Cl.
CPC .............. *F03D 15/00* (2016.05); *F16H 1/22* (2013.01); *F16H 37/065* (2013.01);
(Continued)

(58) Field of Classification Search
CPC ...... F13D 15/00; F16H 57/023; F16H 57/021; F16H 2057/02034
See application file for complete search history.

(56) References Cited

U.S. PATENT DOCUMENTS

| 1,165,829 A | 12/1915 | Alquist |
| 1,351,318 A | 8/1920 | Alquist |

(Continued)

FOREIGN PATENT DOCUMENTS

| DE | 7527359 U | 3/1976 |
| DE | 10134245 A1 | 2/2003 |

(Continued)

OTHER PUBLICATIONS

Hau, E. "Wind Turbines—Fundamentals, Technologies, Application, Economics" 4th edition, Springer-Verlag New York, LLC, 2008, p. 319-320.

(Continued)

*Primary Examiner* — Thomas C Diaz
(74) *Attorney, Agent, or Firm* — Dinsmore & Shohl LLP

(57) ABSTRACT

A method of replacing components of a gearbox and a gearbox of the wind power plant for a wind turbine includes a gearbox with a sun gear couplable to a rotor of a wind power plant. The sun gear is arranged rotatably about a rotor axis. The gearbox has a plurality of satellite units and a plurality of generators. Each satellite unit has two gear shafts and one output shaft. The two gear shafts are respectively in engagement with the sun gear and the output shaft. Each generator is associated with one of the plurality of satellite units. The plurality of satellite units are arranged and distributed over a periphery of the sun gear and are operatively connected with the sun gear. The plurality of satellite units have a modular configuration design and are releasably arranged at the sun gear.

11 Claims, 3 Drawing Sheets

(51) Int. Cl.
*F16H 37/06* (2006.01)
*F16H 57/021* (2012.01)
*F16H 57/023* (2012.01)
*F16H 57/02* (2012.01)

(52) U.S. Cl.
CPC ......... *F16H 57/021* (2013.01); *F16H 57/023* (2013.01); *F16H 2057/02034* (2013.01); *F16H 2057/0235* (2013.01); *F16H 2057/02078* (2013.01)

(56) References Cited

U.S. PATENT DOCUMENTS

| | | | | |
|---|---|---|---|---|
| 6,304,002 | B1* | 10/2001 | Dehlsen | H02K 7/116 |
| | | | | 290/1 C |
| 8,912,681 | B1* | 12/2014 | Filkins | F03D 9/25 |
| | | | | 290/55 |
| 9,903,347 | B2* | 2/2018 | Pedersen | F03D 80/80 |
| 2003/0222456 | A1* | 12/2003 | Mikhail | F03D 15/00 |
| | | | | 290/1 R |
| 2004/0237683 | A1 | 12/2004 | Mikhail et al. | |
| 2006/0138780 | A1* | 6/2006 | Flamang | F03D 15/00 |
| | | | | 290/55 |
| 2008/0207389 | A1* | 8/2008 | Fahrenbach | F16H 37/065 |
| | | | | 475/344 |

FOREIGN PATENT DOCUMENTS

| | | |
|---|---|---|
| DE | 102010040654 A1 | 3/2012 |
| DE | 102010041474 A1 | 3/2012 |
| DE | 112010004882 T5 | 9/2012 |
| DE | 102013003748 A1 | 9/2014 |
| DE | 102015010101 A1 | 2/2017 |
| WO | 2012/030326 A1 | 3/2012 |

OTHER PUBLICATIONS

Iken, J. "Strong Power Trains" Sonne Wind & Wärme 5, 2011, p. 106-108.

* cited by examiner

TRANSMISSION SYSTEM FOR A WIND POWER PLANT

REFERENCE TO RELATED APPLICATIONS

This application is a U.S. national stage application of PCT/DE2017/100829, filed Sep. 28, 2017, which claims priority from German Application No. 10 2016 122 205.4, filed Nov. 18, 2016, the entire content of both of which is incorporated herein by reference.

FIELD OF THE INVENTION

The invention relates to a gearbox for a wind turbine comprising a sun gear that is couplable to a rotor of the wind turbine, and wherein a plurality of satellite units are arranged distributed over the periphery of the sun gear, are in operative connection with the sun gear, and are drivable by generators that can be associated with the satellite units.

BACKGROUND OF THE INVENTION

A gearbox for a wind turbine is known from DE 101 34 245 A1 and a sun gear is arranged rotatably about a rotor axis and can be coupled to a rotor of the wind turbine. A plurality of satellite units are present distributed over the periphery of the gear and are in operative connection with the sun gear, and the slow movement that is introduced into the sun gear by the rotor can be tapped by fast-rotating output pinion shafts. The individual satellite units here form a transmitting operative connection between the sun gear and the output pinion shafts to which generators can be coupled. Disadvantageously, an asymmetrical force flow through planetary shafts results from the arrangements of the satellite units comprising the planetary shafts. The planetary shafts twist in operation here and reductions in the size of the tooth contact surfaces and thus load overshoots can occur at the tooth engagements. In the event of damaged planetary gears or planetary pinions, a replacement of the planetary shafts is possible, but if the sun gear has also been damaged, the dismantling of the total gearbox is necessary.

DE 11 2010 004 882 T5 discloses a gearbox for a wind turbine having a sun gear that is rotatable about a rotor axis, and that is couplable to the rotor of the wind turbine, and a satellite unit is only located at a peripheral position and has a tapping, shalt via which a direct tapping of a rotational movement of the sun gear takes place to couple a generator to the satellite unit. An asymmetrical introduction of force into a casing of the gearbox disadvantageously also results in this embodiment; in addition, only a single generator can be driven.

Substantial forces are introduced into the gearbox due to the very high weight of the turbine head having the rotor and the rotor mount, said forces having to be taken up by a corresponding gearbox mount and finally also by a gearbox casing or a casing of the gearbox. Compression forces, stretching forces, and bending forces act on the gearbox in constantly changing directions, not least also due to the wind loads acting on the rotor. Mechanical and aerodynamic imbalances also strain the gearbox during the whole service life. The gearbox of a wind turbine is consequently exposed to particularly high strains and has to have a certain service-friendliness on a nacelle of the wind turbine. Damage to the gearbox of a wind turbine having a particularly compact structure frequently means a longer and thus cost-intensive downtime of the turbine. The replacement of a total gearbox is in particular very complex and/or expensive in the off-shore sector and has to take place with special means such as with a crane barge or the like. The crane located in the nacelle of a wind turbine can carry up to 8 metric tons (tonnes), for example, with the weight of a total gearbox of a wind turbine substantially exceeding the lifting capacity of the so-called onboard crane. It is consequently desirable also to be able to replace only individual parts of a total gearbox of a wind turbine. A better introduction of force, in particular with a symmetry around the rotor axis, here enables a lighter and smaller design of the gearbox with the same power throughput so that the service friendliness of the gearbox is increased again with a smaller and lighter construction thereof.

SUMMARY OF THE INVENTION

The object of the disclosure is the further development of a gearbox for a wind turbine that has increased service friendliness. For this purpose, the gearbox should in particular be further developed such that parts of the gearbox can be individually replaced. In this process, the gearbox should, however, make a high total power throughput possible with smaller overall dimensions a plurality of generators should in particular be able to be driven mechanically independently of one another by the gearbox.

This object is achieved from a gearbox for a wind turbine and from a method in accordance with this disclosure.

The disclosure includes the technical teaching that the satellite units have two gear shafts that each engaged with the sun gear and an output shaft, wherein the output shaft is in engagement with the two gear shafts and is couplable to an associated generator, and wherein the satellite units are configured in a modular manner and are releasably arranged at the sun gear.

The key idea of the disclosure is formed by individually handleable and thus modularly configured satellite units that are releasable from the gearbox, that are configured with multiple shafts, and that thus permit an increased power throughput. The satellite units have two gear shafts in accordance with the disclosure that are each in engagement with the sun gear and the gear shafts cooperate with an output shaft, with the tooth ratios being designed such that the output shaft has a higher speed than the gear shafts. The possibility thus results of an increased power throughput by each of the individual satellite units to couple a correspondingly dimensioned generator to the respective satellite unit. Due to the modular design of the satellite unit, it can be released from the gearbox as a single part and the gear shafts can be taken out of engagement with the sun gear. The satellite module can handled and transported free of loss of any substantial quantities of lubricating oil and thus separately from the gearbox in an environmentally friendly manner.

A small individual weight of the satellite units that can be handled by the onboard crane of the wind turbine first results as a substantial advantage. A further advantage of the satellite units designed in accordance with the disclosure and removable in a modular manner is that, due to the configuration with two gear shafts and one output shaft, force relationships arise that are symmetrical and that thus the load on the gearbox becomes minimal.

The gear shafts can be decoupled from the sun gear due to the free removability of the satellite units and the generator can furthermore be decoupled from the output shaft. A modular overall design of the gearbox is thereby produced so that the components of the gearbox on the tower of the wind turbine can be separated. As a result, a particularly high service friendliness results despite a highly integrated complete system.

The satellite unit is advantageously, designed in accordance with the disclosure with a satellite frame in which the two gear shafts and the output shaft are rotatably received. The satellite frame of the satellite unit here takes up the forces arising between the gear shafts and the output shaft in operation of the gearbox so that when a plurality of satellite units are distributed over the periphery of the sun gear, a plurality of individual force systems are built up that are closed per se and such that an ideal force exertion results for the casing of the gearbox for the entire gearbox.

A further advantage is achieved in that a gearbox casing is provided and that the sun gear is rotatably arranged within it, with the satellite units being releasably arranged at the gearbox casing. The sun gear here does not have to be rotatably supported in or against the gearbox casing since it is sufficient only to arrange and rotatably receive the sun gear spatially in the gearbox easing. The gearbox casing rather serves to receive the plurality of satellite units distributed over the periphery of the sun gear, with a support of the sun gear in or against the gearbox casing additionally being advantageous.

In accordance with an advantageous variant of the gearbox in accordance with the disclosure, the satellite units are fastened to the gearbox casing at an outer side, with the gearbox casing having a plurality of reception openings arranged evenly distributed over the periphery for receiving the satellite units. The gearbox can thus be operated with a reduced number of satellite units and the gearbox casing, for example, has six reception openings which can be reached from the outside and of which all the reception openings can be fit with satellite units or only individual reception openings are fit with satellite units. The fitting with satellite units should here produce a symmetry about the rotor axis of the sun gear so that the fit reception openings should, for example, have the same angular distribution with respect to one another. The gearbox can thus not only be set up in modular form, but can also be operated in modular form. If, for example due to wind conditions and to the energy requirement, fewer than the maximum possible number of generators are required, only individual reception openings are also fit with satellite units.

Free reception openings can here be closed by a closure plate to increase the stiffness of the gearbox casing.

An advantageous design of the satellite units is achieved if the gear shafts have at least a first toothed section having a smaller number of teeth that mesh with the teeth of the sun gear and the gear shafts can have at least a second toothed section having a larger number of teeth that mesh with the teeth of the output shaft. As a result, the output shaft rotates at a higher speed than the gear shafts, with the gear shafts rotating at a substantially greater speed than the sun gear. Smaller gear teeth forces are produced between the gear shafts and the sun gear due to the two-stage design of the satellite units so that the satellite units make a higher power throughput possible.

It is also of advantage if a first toothed section is formed centrally on the gear shaft between two outer second toothed sections. The toothed sections can here comprise double helical gear teeth to avoid the reception of axial forces over the satellite frame of the satellite units, with straight gear teeth also being conceivable.

To further increase the service friendliness of the gearbox, the individual satellite units should be able to be removed using the onboard crane of the wind turbine. For this purpose, the gearbox casing can further advantageously be configured as rotatable about the sun gear so that the satellite units that should be removed by the crane can be upwardly rotated. The satellite units are in particular designed such that the gear shafts and the output shaft in the satellite frame form a triangular constellation, that is in particular an isosceles triangular constellation, and are supported by means of roller bearings or plain bearings in the satellite frame.

The disclosure is further directed to a method of replacing components of a gearbox for a wind turbine comprising a sun gear that is rotatably arranged about a rotor axis and that can be coupled to a rotor of the wind turbine, and wherein a plurality of satellite units are arranged distributed over the periphery of the sun gear that are in operative connection with the sun gear and via which generators that can be associated with the satellite units can be driven, with the following steps being provided for the method in accordance with the disclosure: Designing the gearbox with a gearbox casing; providing the satellite units in a modular configuration; releasing and outwardly removing the satellite units from the gearbox casing, and arranging a replaced satellite unit at the gearbox casing.

The gearbox casing is advantageously rotated so far about the sun gear before the release and the outward removal that the satellite to be removed is moved into an upper position, in particular to raise the satellite upwardly from the gearbox casing using the onboard crane. The particular advantage of the method in accordance with the disclosure comprises the possibility of separating multi-shaft components that form a satellite by the formation of a separate satellite frame, said satellite unit having a total weight that is smaller than the permitted lifting weight of the onboard crane.

The method in accordance with the disclosure is in particular characterized in that the replaced satellite unit is adapted and/or adjusted at a reference segment of the sun gear before the arrangement at the gearbox casing. The repaired or new satellite unit that should be fastened to the gearbox casing again must be able to form a toothed section with the sun gear that enables an exactly fitting tooth-between-tooth placement of the teeth of the satellite unit into the sun gear The advantage of this is that the sun gear and also the gear shaft and/or the output shaft can be rotated as desired on site.

The satellite units in particular have two respective gear shafts in engagement with the sun gear as well as an output shaft, with the output shaft being in engagement with the two gear shafts and being couplable with an associated generator, and with the adaptation and/or adjustment of the angular positions of at least the gear sections being carried out at the reference segment. The toothed section can be adapted to the reference segment such that further adaptations on the nacelle of the wind turbine itself are not required. The special feature of the removable satellite unit comprises the fact that the teeth would still fit into different tooth gaps outside the reference segment on a subsequent rotation despite an adjustment by means of a reference segment, which substantially facilitates the installation.

The adaptation specifically takes place such that the angular position of at least a first toothed section formed on the gear shaft relative to at least a second toothed section formed on the gear shaft is changed. For example, at least one of the toothed sections on the gear shaft can be released form a base shaft of the toothed shaft via a hydraulic pressure exertion so that said released toothed section is rotatable on the base shaft and thus also with respect to the further toothed section. The rotation takes place here while adapting the toothed section at the reference segment. As soon as the adaptation has taken place, the hydraulic pressure exertion is removed again and the angular positions of the two toothed sections adjusted with respect to one another is maintained. The satellite unit is then freely handleable and a rotation of the gear shafts and of the output shaft, and naturally also of the sun gear, is not harmful for the installation of the satellite unit on site, that is on the nacelle of the wind turbine, since the teeth fit with an exact fit into the teeth gaps of the sun gear in every rotated position.

The method is further characterized in that the gearbox casing has a plurality of reception openings, with the arrangement of satellite units being carried out in dependence on requirements in all the reception openings or in a smaller number of reception openings, with the arrangement of the satellite units being carried out such that a symmetry is formed about the rotor axis, in particular with respect to the geometry and with respect to the forces acting in the gearbox casing. The fitting of the gearbox with individual satellite units and associated generators consequently takes place in dependence on requirements and the wind turbines can be configured such that they enable an optimum utilization of available wind power without too many or too few generators being put into operation.

BRIEF DESCRIPTION OF THE DRAWINGS

Further measures improving the disclosure are shown in more detail below together with the description of, a preferred embodiment of the disclosure with reference to the Figures. There are shown.

DETAILED DESCRIPTION OF THE INVENTION

Figure 1:
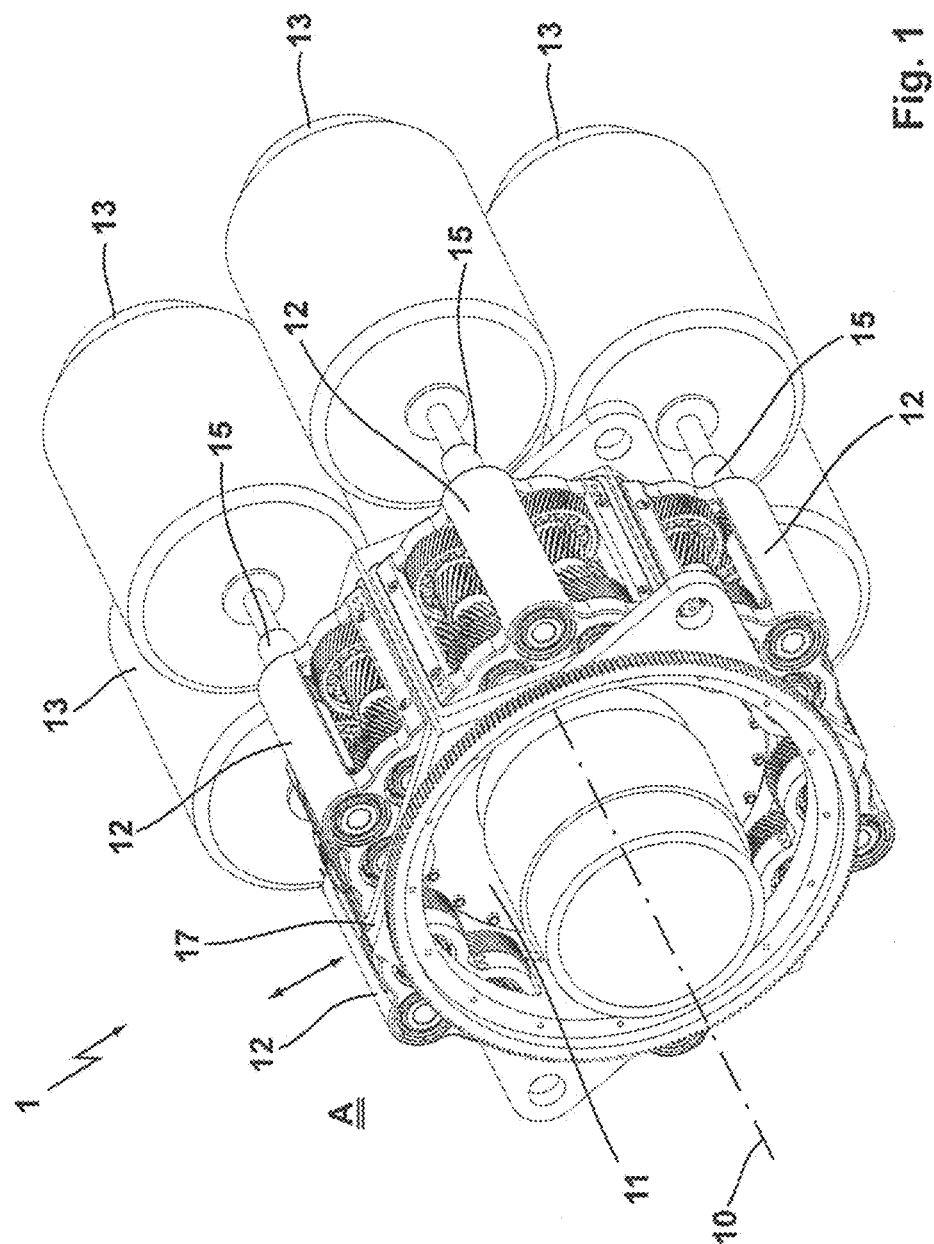
FIG. 1 is a perspective view of the gearbox with a full fitting of the gearbox casing with satellite units and with a full number of associated generators.

FIG. 1 shows a gearbox 1 for a wind turbine having the features of the disclosure in a perspective view. A sun gear 11 is rotatably received about a rotor axis 10, with the reception and support of the sun gear 11 not being show in any more detail in the embodiment and being configured in a manner known per se. The gearbox 1 has a gearbox casing 17 as a base structure and a plurality of satellite units 12 are arranged distributed over the periphery on it. The satellite units 12 cooperate with the sun gear 11 so that on a rotational movement of the sun gear 11 about the rotor axis 10, a fast rotational movement of the output shafts 15 of the satellite units 12 takes place. The output shafts 15 are coupled to the generators 13.

The fitting of the gearbox casing 17 with satellite units 12 distributed evenly over the periphery produces a balanced force ratio around the sun gear 11 and the generators 13 are likewise arranged evenly distributed and symmetrically about the rotor axis 10.

The satellite units 12 are releasably arranged at the gearbox casing 17 and a satellite unit 12 can be removed toward the outside A radially to the rotor axis 10 on a defect of said satellite unit 12. A replacement satellite unit 12 can subsequently be installed in the same reception opening in the gearbox casing 17 again. A further special feature comprises the sun gear 11 also being able to be axially dismantled and replaced by the onboard crane in a damage case after a removal of all the satellite units 12.

Figure 2:
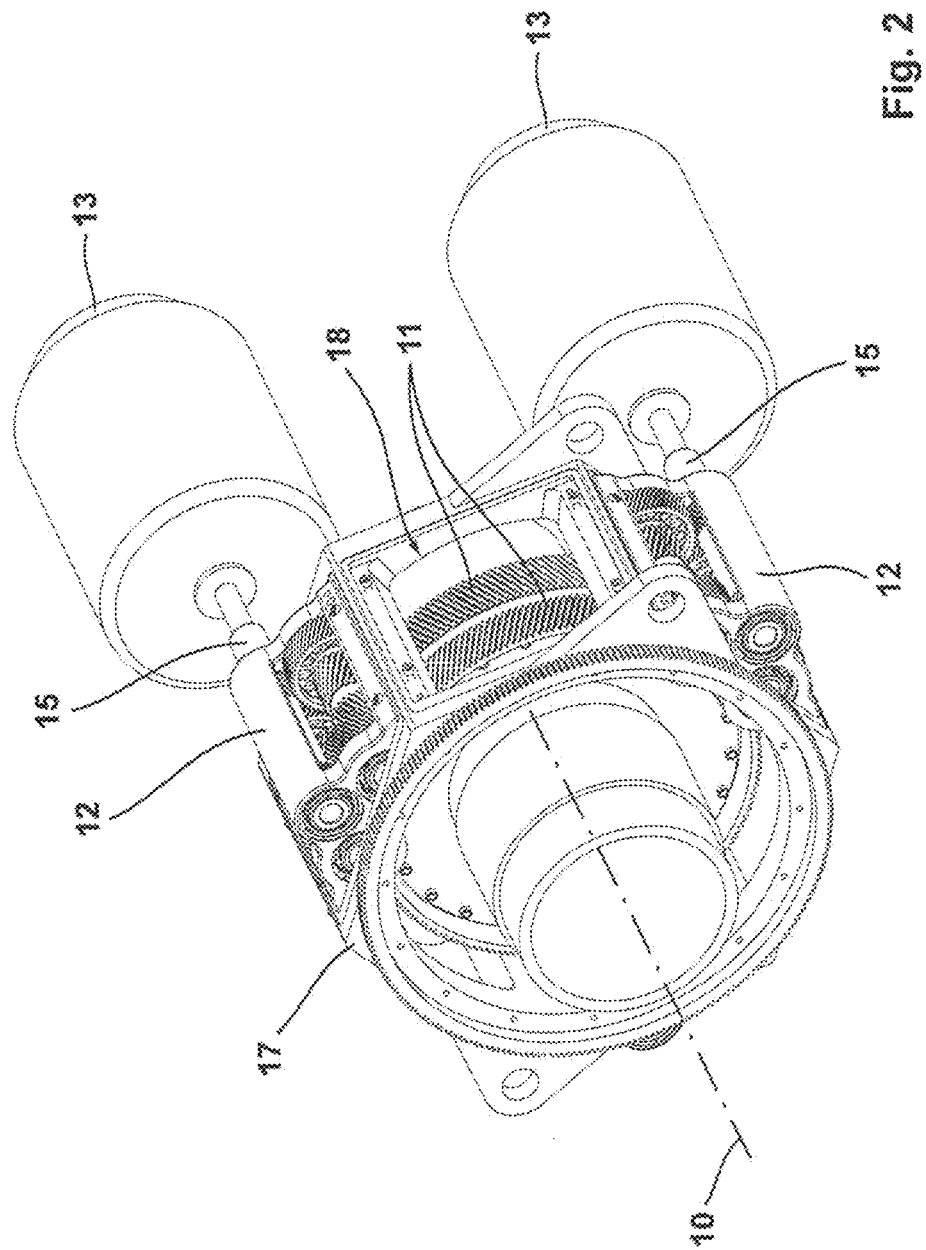
FIG. 2 is the gearbox in accordance with FIG. 1, with only three satellite units being arranged at the gearbox casing evenly distributed with respect to one another over the periphery so that also only three generators are provided of which two are visible in the perspective view.

FIG. 2 shows an example of the gearbox 1 with a reduced fitting of the gearbox casing 17 with satellite units 12 so that a smaller number of generators 13 is also provided. Reception openings 18 into which the satellite units 12 can be inserted are shown through the gearbox casing 17 only partly occupied by satellite units 12 and the reception openings 18 are formed above the end face of the sun gear 11 so that the satellite units 12 can cooperate with the sun gear 11 when they are introduced into respective receptions openings 18. Due to the associated number of generators 13 for fitting the gearbox casing 17 with the satellite units 12, the former are connected to the output shafts 15 of the satellite units 12, and if the sun gear 11 is driven about the rotor axis 10, the generators 13 can be operated in the same manner and at a desired individual power level as also with a full fitting of the gearbox 1 in accordance with FIG. 1. The gearbox easing 17 is formed as hexagonal with the option of installing and operating 2, 3, 4, or 6 generators 13 symmetrically. This option includes differently loading every individual generator 13 as part of an optimized operating strategy of a plurality of installed generators 13.

Figure 3:
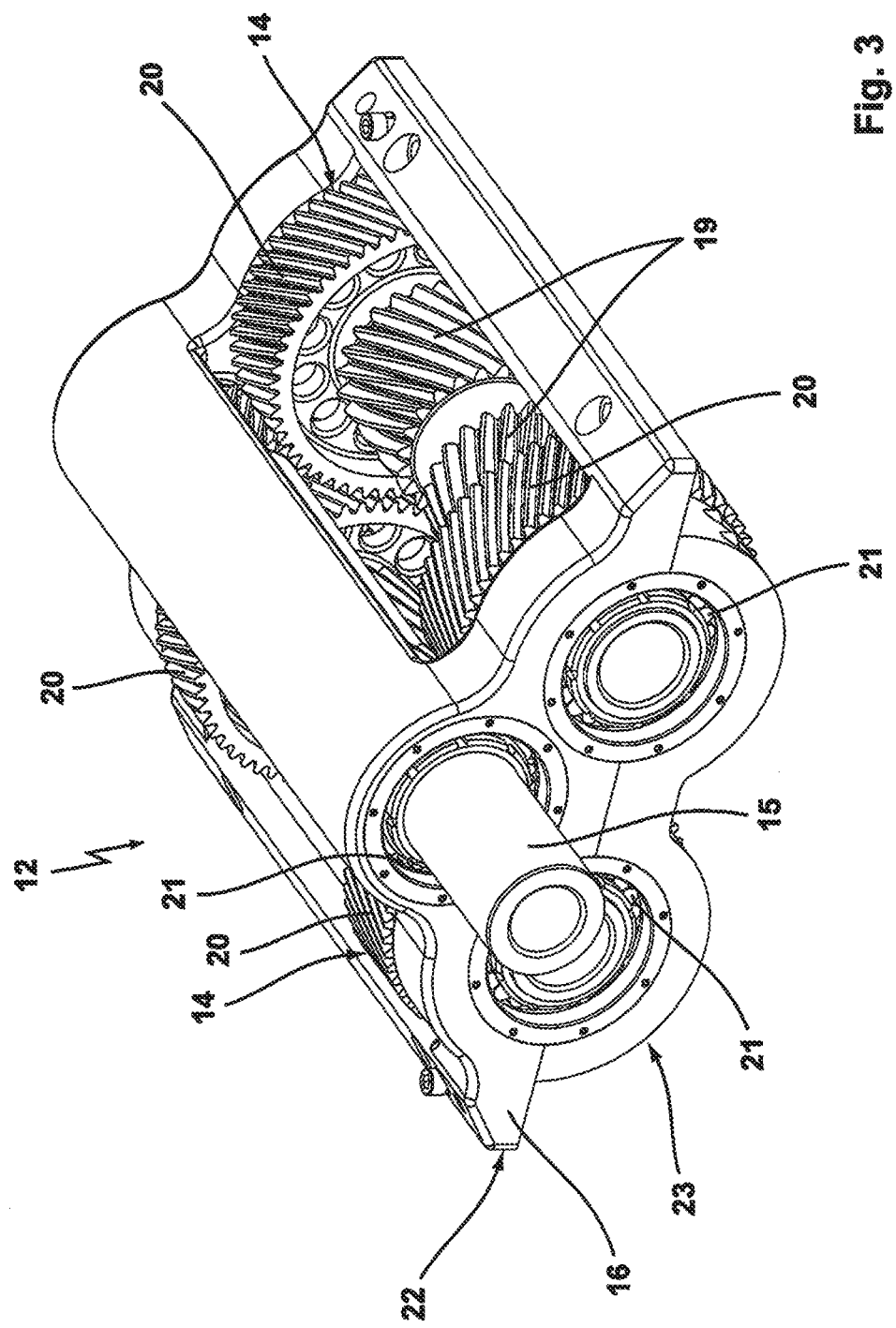
FIG. 3 is a perspective view of the satellite unit with two gear shafts and one output shaft that are received in a satellite frame of the satellite unit.

FIG. 3 shows a perspective view of a satellite unit 12 for arrangement at a gearbox casing 17 of a gearbox 1 in accordance with FIGS. 1 and 2. The satellite unit 12 has a satellite frame 16 as the base body and the satellite frame 16 has an upper part 22 and a lower part 23. The gear shafts 14 and the output shaft 15 are supported by means of roller bearings 21 in the satellite frame 16.

The embodiment shows the gear shafts 14 with inwardly disposed first toothed sections 19 for operative connection with the sun gear 11 and with outwardly disposed second toothed sections 20 for operative connection with the output shaft 15. The shafts 14 and 15 are accommodated in the satellite frame 16 in a triangular arrangement and due to the tooth ratios of the first and second gear sections 19 and 20 and of the output shaft 15, the output shaft 15 rotates at a higher speed than the gear shafts 14.

The disclosure is not restricted in its design to the preferred embodiment provided above. A number of variants is rather conceivable that also makes use of the solution shown with generally differently designed embodiments. All the features and/or advantages, including any construction details or spatial arrangements, originating from the claims, the description or the drawings can be essential to the disclosure both per se and in the most varied combinations.

It is intended that the scope be defined by the claims appended hereto.

REFERENCE NUMERAL LIST 1 gearbox
10 rotor axis
11 sun gear
12 satellite unit
13 generator
14 gear shaft
15 output shaft
16 satellite frame
17 gearbox casing
18 reception opening
19 first toothed section 20 second toothed section
21 roller bearing
22 upper part
23 lower part
A outside

The invention claimed is:

1. A gearbox of a wind power plant for a wind turbine, comprising:
  a sun gear couplable to a rotor of a wind power plant and arranged rotatably about a rotor axis;
  a plurality of satellite units, each satellite unit comprising two gear shafts and a output shaft, the two gear shafts respectively in engagement with the sun gear and the output shaft; and
  a plurality of generators, each generator being associated with one of the plurality of satellite units;
  the plurality of satellite units being arranged and distributed over a periphery of the sun gear and being operatively connected with the sun gear, the plurality of satellite units each having a modular configuration design and being releasably arranged at the sun gear;
  each of the output shafts being in engagement with the respective two gear shafts and being couplable with the associated satellite unit, and each of the generators being driven by the respective satellite unit;
  a gearbox casing, wherein the sun gear is rotatably arranged within the gearbox casing and the plurality of satellite units are releasably arranged at the gearbox casing; and
  wherein the gearbox casing is formed rotatably about the sun gear.

2. The gearbox of claim 1, wherein each of the satellite units comprises a satellite frame in which the two gear shafts and the output shaft are rotatably received.

3. The gearbox of claim 1, wherein the gearbox casing comprises a plurality of reception openings arranged in an evenly distributed manner over the periphery of the sun gear for the reception of the plurality of satellite units, which are fastened to the gearbox casing from an outer side.

4. The gearbox of claim 1, wherein one of the two gear shafts comprises a first toothed section and a second toothed section, the first toothed section having a smaller number of teeth that mesh with teeth of the sun gear and the second toothed section having a larger number of teeth with respect to the first toothed section, and the larger number of teeth of the second toothed section mesh with teeth of the output shaft.

5. The gearbox of claim 4, wherein the second toothed section of one of the two gear shafts comprises two outer second toothed sections and the one of the two gear shafts has the first toothed section formed centrally between the two outer second toothed sections.

6. The gearbox of claim 4, wherein the first toothed section, the second toothed section or both comprise helical gear teeth or dual helical gear teeth.

7. The gearbox of claim 2, wherein each of the satellite unit comprises roller bearings, the two gear shafts and the output shaft forming a triangular constellation in the satellite frame and being supported by the roller bearings.

8. A method of replacing components of a gearbox for a wind turbine, comprising the steps of:
  providing a gearbox comprising:
    a sun gear couplable to a rotor of a wind turbine and arranged rotatably about a rotor axis,
    a plurality of satellite units arranged and distributed over a periphery of the sun gear and operatively connected with the sun gear, and
    a plurality of generators, each generator being associated with one of the plurality of satellite units and each of the generators being driven by the respective satellite unit;
  designing the gearbox with a gearbox casing;
  providing the plurality of satellite units in a modular configuration design;
  releasing and outwardly removing one of the plurality of satellite units from the gearbox casing; and
  arranging a replaced satellite unit at the gearbox casing;
  wherein the step of releasing and outwardly removing comprises rotating the gearbox casing about the sun gear before the release and before the outwardly removal of one of the plurality of satellite units to move one of the plurality of satellite units to be removed into an upper position that can be handled by a crane.

9. The method of claim 8, wherein the step of arranging the replaced satellite unit comprises adapting and/or adjusting the replaced satellite unit at a reference segment of the sun gear before arranging the replaced satellite unit at the gearbox casing.

10. The method of claim 9, wherein each of the plurality of satellite units comprises two gear shafts and one output shaft, the two gear shafts respectively in engagement with the sun gear and the output shaft, a first toothed section formed on one of the two gear shafts and a second toothed section formed on the other of the two gear shafts, the output shaft being in engagement with the two gear shafts and being couplable to an associated generator, and the step of adapting the replaced satellite comprises changing a angular position of the first toothed section formed on the gear shaft relative to the second toothed section formed on the gear shaft.

11. The method of claim 8, wherein the gearbox casing comprises a plurality of reception openings, and the step of arranging a replaced satellite unit comprises arranging one or more of the replaced satellites in one or more of the plurality of reception openings in a symmetrical formation about the rotor axis in the gearbox casing.

* * * * *